US 11,572,823 B2

(12) United States Patent
Hayashi et al.

(10) Patent No.: US 11,572,823 B2
(45) Date of Patent: Feb. 7, 2023

(54) VARIABLE CAPACITY TURBOCHARGER

(71) Applicant: IHI Corporation, Tokyo (JP)

(72) Inventors: Katsunori Hayashi, Tokyo (JP); Yuji Kobayashi, Tokyo (JP); Takafumi Ueda, Tokyo (JP); Kazuhiro Onitsuka, Tokyo (JP); Fumihiko Fukuhara, Tokyo (JP)

(*) Notice: Subject to any disclaimer, the term of this patent is extended or adjusted under 35 U.S.C. 154(b) by 0 days.

(21) Appl. No.: 17/468,678

(22) Filed: Sep. 8, 2021

(65) Prior Publication Data

US 2021/0404376 A1    Dec. 30, 2021

Related U.S. Application Data

(63) Continuation of application No. PCT/JP2019/031208, filed on Aug. 7, 2019.

(30) Foreign Application Priority Data

Mar. 20, 2019    (JP) .............................. JP2019-053099

(51) Int. Cl.
*F02B 37/24* (2006.01)
*F01D 17/16* (2006.01)

(52) U.S. Cl.
CPC ............ *F02B 37/24* (2013.01); *F01D 17/165* (2013.01); *F05D 2220/40* (2013.01); *F05D 2240/128* (2013.01)

(58) Field of Classification Search
CPC ........ F02B 37/24; F02B 39/00; F01D 17/165; F05D 2220/40; F05D 2240/128; Y02T 10/12
See application file for complete search history.

(56) References Cited

U.S. PATENT DOCUMENTS

2010/0209232 A1    8/2010   Stein et al.
2010/0247296 A1*   9/2010   Matsuyama .......... F01D 17/165
                                                                  415/170.1
(Continued)

FOREIGN PATENT DOCUMENTS

DE    102011086310 A1 *  5/2013   ........... F01D 17/165
EP    2837791             2/2015
(Continued)

OTHER PUBLICATIONS

International Preliminary Report on Patentability with Written Opinion dated Sep. 30, 2021 for PCT/JP2019/031208.
(Continued)

*Primary Examiner* — Audrey B. Walter
*Assistant Examiner* — Edward Bushard
(74) *Attorney, Agent, or Firm* — Soei Patent & Law Firm

(57) ABSTRACT

A variable capacity turbocharger includes a variable nozzle unit having a shroud-side ring in which a first bearing hole is provided, a hub-side ring in which a second bearing hole is provided, a nozzle flow path formed between the shroud-side ring and the hub-side ring, and a nozzle vane disposed in the nozzle flow path and supported by both the first bearing hole and the second bearing hole. A turbine housing having a scroll flow path is connected to the nozzle flow path, in which the first bearing hole penetrates the shroud-side ring and communicates with the scroll flow path through a gap between the shroud-side ring and the turbine housing. Additionally, an opening of the first bearing hole on the gap side is smaller than an opening of the first bearing hole on the nozzle flow path side.

20 Claims, 5 Drawing Sheets

(56) References Cited

U.S. PATENT DOCUMENTS

| | | |
|---|---|---|
| 2013/0027284 A1 | 1/2013 | Sakamaki et al. |
| 2013/0170976 A1 | 7/2013 | Ramb et al. |
| 2013/0272847 A1 | 10/2013 | Martens et al. |
| 2016/0258316 A1 | 9/2016 | Ueda et al. |

FOREIGN PATENT DOCUMENTS

| | | | |
|---|---|---|---|
| JP | 2009-144545 | | 7/2009 |
| JP | 2009-243375 | | 10/2009 |
| JP | 2013-002293 | | 1/2013 |
| JP | 2013-537957 | | 10/2013 |
| JP | 2013-245655 | | 12/2013 |
| JP | 2014-001639 | | 1/2014 |
| JP | 2015-140739 | | 8/2015 |
| JP | 2015-229989 | | 12/2015 |
| JP | 2018-025125 | | 2/2018 |
| JP | 2018025125 A | * | 2/2018 |
| WO | 2012/040039 | | 3/2012 |

OTHER PUBLICATIONS

International Search Report dated Oct. 29, 2019 for PCT/JP2019/031208.

* cited by examiner

VARIABLE CAPACITY TURBOCHARGER

CROSS-REFERENCE TO RELATED APPLICATION

This application is a continuation application of PCT Application No. PCT/JP2019/031208, filed Aug. 7, 2019, which claims the benefit of priority from Japanese Patent Application No. 2019-053099, filed Mar. 20, 2019, the entire contents of which are incorporated herein by reference.

BACKGROUND

A variable capacity turbocharger is described in Japanese Unexamined Patent Publication No. 2009-243375, Japanese Unexamined Patent Publication No. 2013-002293, and Japanese Unexamined Patent Publication No. 2013-245655. Conventional turbochargers include a variable nozzle unit that rotates a nozzle vane in a nozzle flow path. In the variable nozzle unit, there is a clearance in an axial direction between a vane main body of the nozzle vane and the nozzle flow path so that the nozzle vane is smoothly rotated. The vane main body is movable in the axial direction in the nozzle flow path.

SUMMARY

During operation of a turbocharger, a vane main body may be positioned closer to a shroud side in an axial direction to improve performance of the turbocharger. However, where the vane main body is positioned in a nozzle flow path depends on a balance of pressure acting axially on a vane rotation shaft. Such a pressure balance is related to a pressure relationship of parts in a turbine and has been difficult to adjust. On the other hand, if the vane main body is too close to the shroud side or experiences too much pressure, this may result in friction with a wall surface of the nozzle flow path which may hinder the smooth rotation of the nozzle vane.

The present disclosure describes an example turbocharger in which a vane main body of a nozzle vane is positioned sufficiently close to a shroud side during operation while avoiding excess pressure and friction.

An example variable capacity turbocharger includes a variable nozzle unit and a turbine housing. The variable nozzle unit has a shroud-side ring in which a first bearing hole is provided, a hub-side ring in which a second bearing hole is provided, a nozzle flow path formed between the shroud-side ring and the hub-side ring, and a nozzle vane disposed in the nozzle flow path and supported by both the first bearing hole and the second bearing hole. The turbine housing has a scroll flow path connected to the nozzle flow path. The first bearing hole penetrates the shroud-side ring and communicates with the scroll flow path through a gap between the shroud-side ring and the turbine housing. And an opening of the first bearing hole on the gap side is smaller than an opening of the first bearing hole on the nozzle flow path side.

An example variable capacity turbocharger includes a variable nozzle unit and a turbine housing. The variable nozzle unit includes a first nozzle ring in which a first bearing hole is provided, a second nozzle ring in which a second bearing hole is provided. The variable capacity turbocharger includes a nozzle flow path formed between the first nozzle ring and the second nozzle ring, a nozzle vane disposed in the nozzle flow path and supported by both the first bearing hole and the second bearing hole, and a turbine housing including a scroll flow path connected to the nozzle flow path. The first bearing hole penetrates the first nozzle ring and communicates with the scroll flow path through a gap between the first nozzle ring and the turbine housing. And, a first opening of the first bearing hole adjacent to the gap is smaller than a second opening of the first bearing hole adjacent to the nozzle flow path.

An example variable capacity turbocharger includes a housing, a turbine impeller at least partially located in the housing and a scroll flow path located in the housing and encircling the turbine impeller. The variable capacity turbocharger includes a first nozzle ring and a second nozzle ring facing each other in the housing, a nozzle flow path located between the first nozzle ring and the second nozzle ring and fluidly coupling the scroll flow path to the turbine impeller. The variable capacity turbocharger includes a plurality of nozzle vanes located in the nozzle flow path and configured to adjust a flow rate of the nozzle flow path, a gap formed between the first nozzle ring and the housing, and located on an opposite side of the first nozzle ring to the nozzle flow path and a bearing hole located in the first nozzle ring and rotatably supporting a rotation shaft of the nozzle vane. The first nozzle ring may include a ring main body part facing the nozzle flow path and a lid member joined to the ring main body part and facing the gap. The bearing hole penetrates the ring main body part and the lid member.

DETAILED DESCRIPTION

One example disclosed herein, a variable capacity turbocharger includes a variable nozzle unit and a turbine housing. The variable nozzle unit has a shroud-side ring in which a first bearing hole is provided, a hub-side ring in which a second bearing hole is provided, a nozzle flow path formed between the shroud-side ring and the hub-side ring, and a nozzle vane disposed in the nozzle flow path and supported by both the first bearing hole and the second bearing hole. The turbine housing has a scroll flow path connected to the nozzle flow path. The first bearing hole penetrates the shroud-side ring and communicates with the scroll flow path through a gap between the shroud-side ring and the turbine housing. And an opening of the first bearing hole on the gap side is smaller than an opening of the first bearing hole on the nozzle flow path side.

In some example, the first bearing hole may include a large diameter part positioned on the nozzle flow path side, provided in a columnar shape, and into which a first rotation shaft of the nozzle vane is inserted, and a small diameter part positioned on the gap side and having a smaller diameter than the large diameter part. And, a length of the first rotation shaft in an axial direction may be smaller than a length of the large diameter part in the axial direction.

The shroud-side ring may include a ring main body part having the large diameter part penetrating thereinto, and a lid member joined to a surface of the ring main body part on the gap side to close the large diameter part and having the small diameter part which allows the gap and the large diameter part to communicate with each other.

The nozzle vane may include the first rotation shaft inserted into the first bearing hole and a second rotation shaft inserted into the second bearing hole, and a projection area of the first rotation shaft when viewed in the axial direction may be equal to a projection area of the second rotation shaft when viewed in the axial direction.

Figure 1:
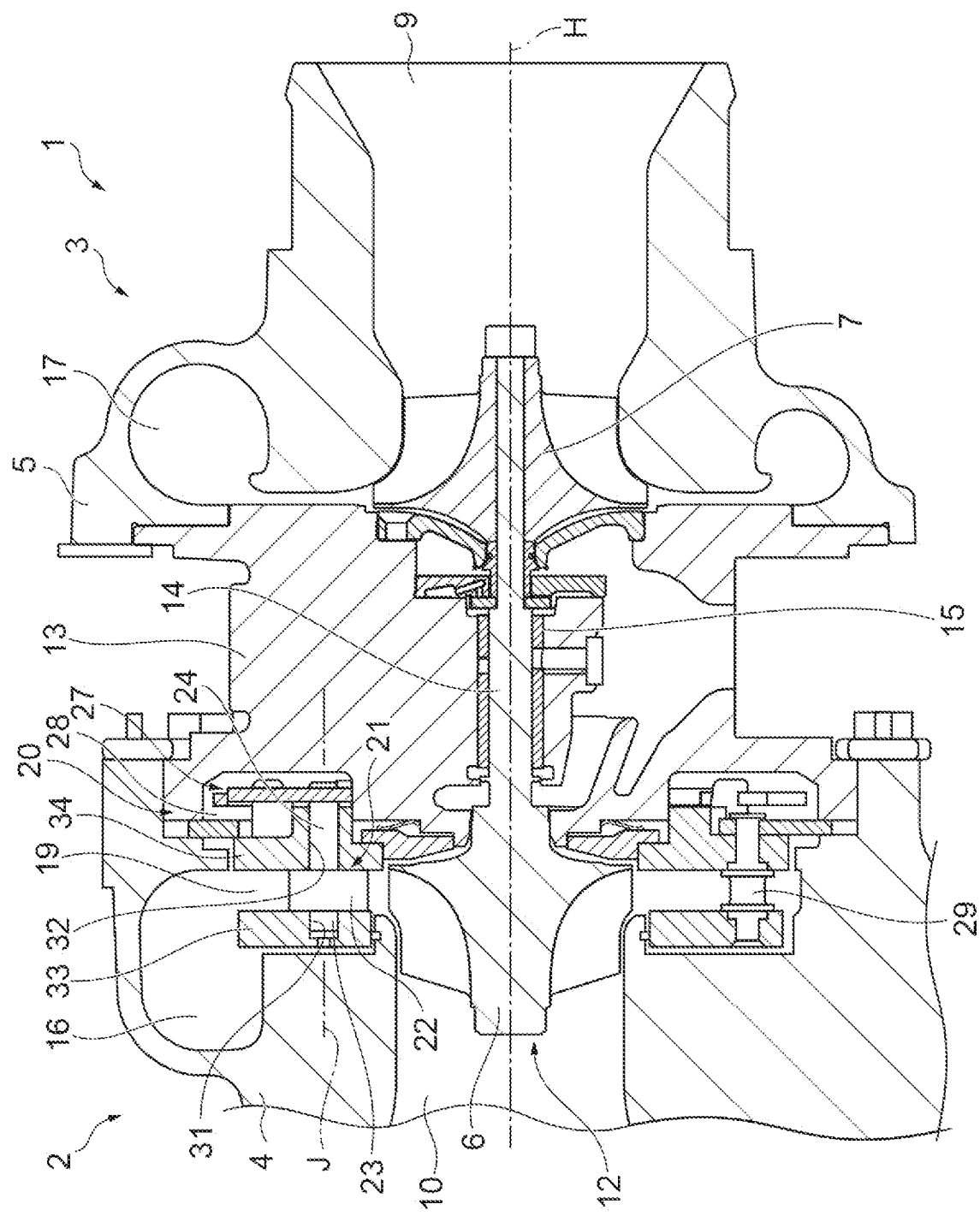
FIG. 1 is a cross-sectional view of an example variable capacity turbocharger.

In the following description, with reference to the drawings, the same reference numbers are assigned to the same components or to similar components having the same function, and overlapping description is omitted. FIG. 1 is a cross-sectional view of an example variable capacity turbocharger 1 along a cross section including a rotation axis H. The turbocharger 1 may be applied to, for example, an internal combustion engine of a ship or a car.

As illustrated in FIG. 1, the turbocharger 1 includes a turbine 2 and a compressor 3. The turbine 2 includes a turbine housing 4 and a turbine impeller 6 housed in the turbine housing 4. The turbine housing 4 includes a scroll flow path 16 extending in a circumferential direction around the turbine impeller 6. The compressor 3 includes a compressor housing 5 and a compressor impeller 7 housed in the compressor housing 5. The compressor housing 5 includes a scroll flow path 17 extending in a circumferential direction around the compressor impeller 7.

The turbine impeller 6 is provided at one end of a rotating shaft 14, and the compressor impeller 7 is provided at the other end of the rotating shaft 14. A bearing housing 13 is provided between the turbine housing 4 and the compressor housing 5. The rotating shaft 14 is rotatably supported by the bearing housing 13 via a bearing 15, and the rotating shaft 14, the turbine impeller 6, and the compressor impeller 7 rotate around the rotation axis H as an integrated rotating body 12.

An exhaust gas inlet and an exhaust gas outlet 10 are provided in the turbine housing 4. An exhaust gas discharged from an internal combustion engine flows into the turbine housing 4 through the exhaust gas inlet, flows into the turbine impeller 6 through the scroll flow path 16, and rotates the turbine impeller 6. Thereafter, the exhaust gas flows out of the turbine housing 4 through the exhaust gas outlet 10.

A suction port 9 and a discharge port are provided in the compressor housing 5. When the turbine impeller 6 rotates as described above, the compressor impeller 7 rotates via the rotating shaft 14. The rotating compressor impeller 7 suctions outside air through the suction port 9. This air passes through the compressor impeller 7 and the scroll flow path 17, is compressed, and is discharged from the discharge port. The compressed air discharged from the discharge port is supplied to the internal combustion engine described above.

The turbine 2 of the turbocharger 1 will be further described. In the following description, the terms "axial direction," "radial direction," and "circumferential direction" indicate a rotation axis direction (rotation axis H direction), a rotation radial direction, and a rotation circumferential direction of the turbine impeller 6, respectively.

In the turbine 2, a movable nozzle vane 21 is provided in a nozzle flow path 19 that connects the scroll flow path 16 and the turbine impeller 6. A plurality of nozzle vanes 21 are disposed at regular intervals on a circumference centered on the rotation axis H. The nozzle vanes 21 each rotate around a rotation axis J parallel to the rotation axis H in synchronization. When the plurality of nozzle vanes 21 rotate as described above, each gap between adjacent nozzle vanes 21 expands and contracts, and an opening degree (a flow rate) of the nozzle flow path 19 is adjusted.

In order to drive the nozzle vanes 21 as described above, the turbine 2 includes a variable nozzle unit 20. The variable nozzle unit 20 is fitted inside the turbine housing 4 and is fixed to be sandwiched between the turbine housing 4 and the bearing housing 13.

The variable nozzle unit 20 includes the plurality of nozzle vanes 21 described above, and a shroud-side ring (first nozzle ring) 33 and a hub-side ring (second nozzle ring) 34 that sandwich the nozzle vanes 21 in the axial direction. The shroud-side ring 33 and the hub-side ring 34 each form a ring shape with the rotation axis H as a center and are disposed to surround the turbine impeller 6 in the circumferential direction. A region sandwiched between the shroud-side ring 33 and the hub-side ring 34 in the axial direction forms the nozzle flow path 19 described above. The shroud-side ring 33 and the hub-side ring 34 are connected by a plurality of connecting pins 29 extending in the axial direction. When dimensions of the connecting pins 29 are manufactured accurately, dimensional accuracy of the nozzle flow path 19 in the axial direction is secured.

The same number of bearing holes 31 (first bearing holes) as the number of nozzle vanes 21 are provided in the shroud-side ring 33. Similarly, the same number of bearing holes 32 (second bearing holes) as the number of nozzle vanes 21 are provided in the hub-side ring 34. The nozzle vanes 21 each include a vane main body 22 that rotates in the nozzle flow path 19, a columnar vane rotation shaft 23 (first rotation shaft) that extends from the vane main body 22 to the shroud-side ring 33 side, and a columnar vane rotation shaft 24 (second rotation shaft) that extends toward the hub-side ring 34 side. The vane rotation shaft 23 and the vane rotation shaft 24 have columnar shapes having the same outer diameter. The vane rotation shaft 23 is rotatably inserted into the bearing hole 31, and the vane rotation shaft 24 is rotatably inserted into the bearing hole 32. With this structure, the nozzle vane 21 is supported by both the bearing hole 31 and the bearing hole 32. The vane shafts 23 and 24 align along the rotation axis J of the nozzle vane 20.

Each vane rotation shaft 24 penetrates the hub-side ring 34, and an end portion of each vane rotation shaft 24 is connected to a drive mechanism 27 on a back surface side of the hub-side ring 34. The drive mechanism 27 is housed in a mechanism space 28 formed between the hub-side ring 34 and the bearing housing 13. A driving force from an actuator is transmitted to each vane rotation shaft 24 via the drive mechanism 27. Due to the above-described driving force, each nozzle vane 21 rotates around the rotation axis J with the vane rotation shafts 23 and 24 as a center.

As a clearance for rotating the nozzle vane 21, a length of the vane main body 22 in the axial direction is slightly smaller than a length of the nozzle flow path 19 in the axial direction. Therefore, the nozzle vane 21 has a slight allowance in the axial direction, that is, the vane main body 22 is slightly movable in the axial direction in the nozzle flow path 19.

Figure 2:
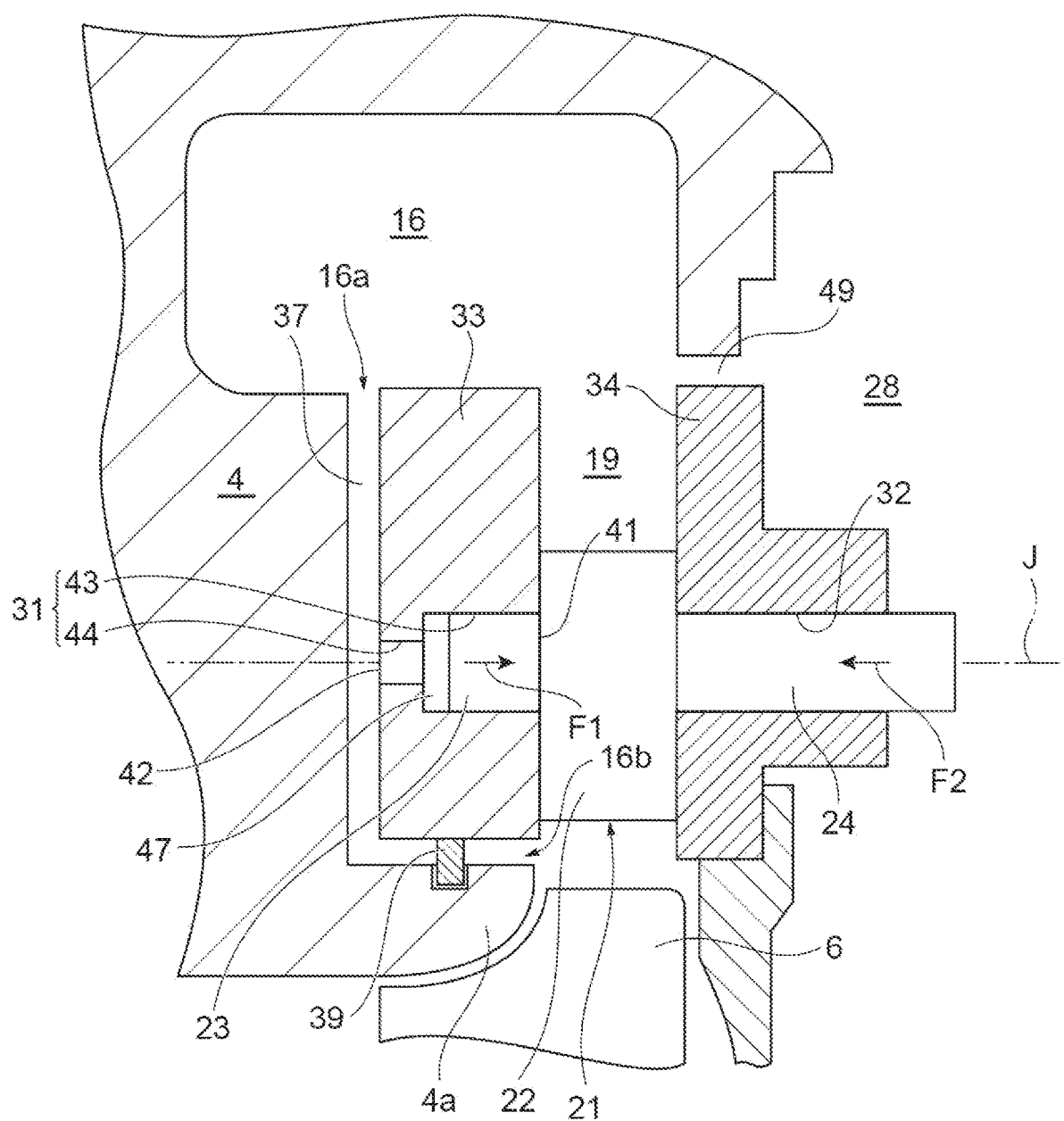
FIG. 2 is an enlarged cross-sectional view of a part of a nozzle unit including a nozzle vane illustrated FIG. 1.
Figure 3:
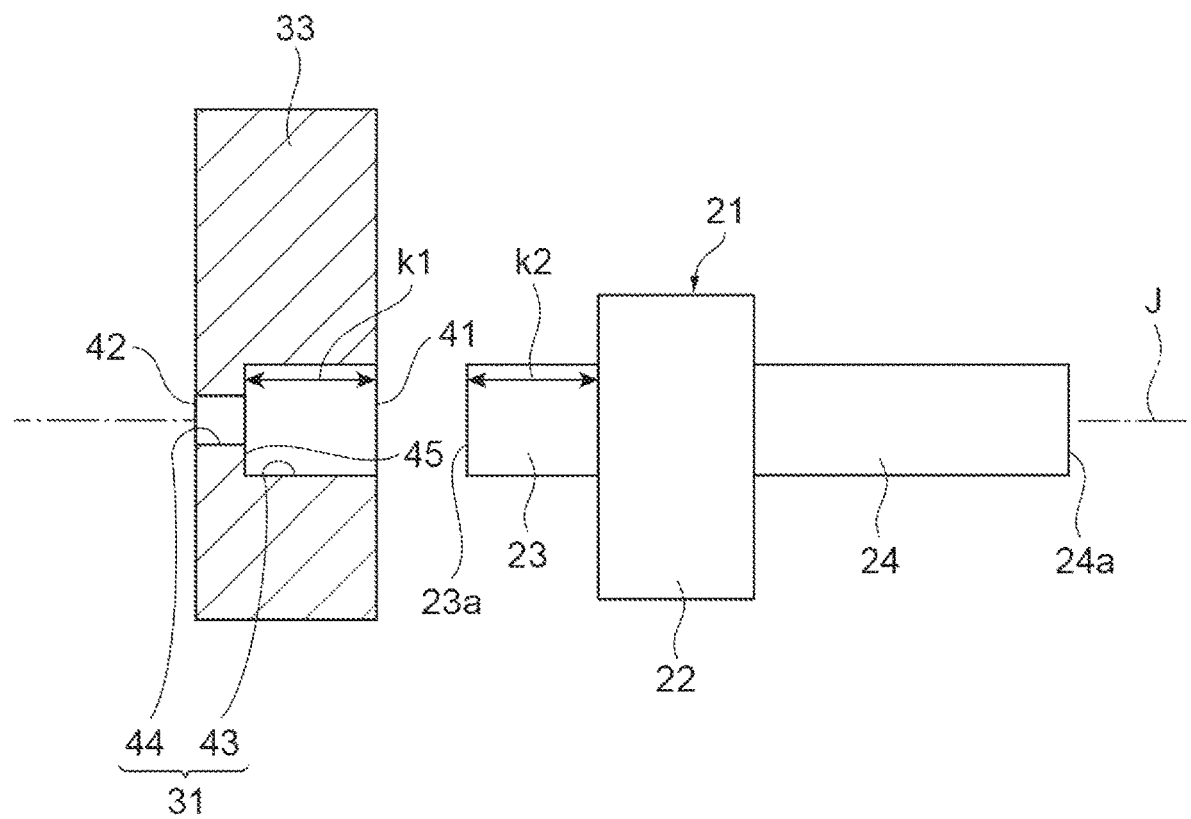
FIG. 3 is a cross-sectional view illustrating the nozzle vane of FIG. 2 and a shroud-side ring in an exploded manner.

Additional structural features in the vicinity of the nozzle vane 21 will be described with reference to FIGS. 2 and 3. FIG. 2 is a cross-sectional view illustrating the nozzle vane 21 and shroud-side ring 33 of the nozzle unit 20. FIG. 3 is a cross-sectional view illustrating the nozzle vane 21 and the shroud-side ring 33 in an exploded manner.

As illustrated in FIG. 2, a gap 37 is formed in the axial direction between the turbine housing 4 and the shroud-side ring 33. The gap 37 extends from the scroll flow path 16 to an inlet of the turbine impeller 6. The gap 37 includes a first end 16a connected to the scroll flow path 16 and a second end 16b connected to the nozzle flow path 19. The second end 16b is provided between the nozzle vane 21 and the turbine impeller 6. Since the gap 37 is sealed by a sealing member 39 in the vicinity of the inlet of the turbine impeller 6, an amount of gas that passes from the scroll flow path 16 to the inlet of the turbine impeller 6 is small. The sealing member 39 is located near the second end 16b and arranged between the shroud-side ring 33 and the turbine impeller 6. The turbine housing 4 has a portion 4a encircling the turbine impeller 6 and is located between the shroud-side ring 33 and the turbine impeller 6. The sealing member 39 is located between the portion 4a and the shroud-side ring 33.

The bearing hole 31 is formed to penetrate the shroud-side ring 33 in the axial direction and is open to both the nozzle flow path 19 side and the gap 37 side. Hereinafter, an opening of the bearing hole 31 on the nozzle flow path side is referred to as an opening (second opening) 41, and an opening of the bearing hole 31 on the gap 37 side is referred to as an opening (first opening) 42. The opening 41 is adjacent to the nozzle flow path 19. The opening 42 is adjacent to the gap 37. A diameter of the opening 42 is smaller than a diameter of the opening 41. The bearing hole 31 includes a large diameter part (portion) 43 having the opening 41 and provided on the nozzle flow path 19 side, and a small diameter part (portion) 44 having the opening 42 and provided on the gap 37 side. The large diameter part 43 and the small diameter part 44 have a columnar shape with the rotation axis J as a columnar axis. A stepped diameter surface 45 is formed at a boundary position between the large diameter part 43 and the small diameter part 44, and the diameter of the small diameter part 44 is less than the large diameter part 43.

An inner diameter of the large diameter part 43 is slightly larger than an outer diameter of the vane rotation shaft 23. The vane rotation shaft 23 having a columnar shape is inserted into the large diameter part 43. On the other hand, an inner diameter of the small diameter part 44 is smaller than the inner diameter of the large diameter part 43 and is smaller than the outer diameter of the vane rotation shaft 23. Also, a length k1 of the large diameter part 43 in the axial direction is larger than a length k2 of the vane rotation shaft 23 in the axial direction. Therefore, in a state in which the vane rotation shaft 23 is inserted into the large diameter part 43, a gap 47 in the axial direction is formed between a distal end surface 23a of the large diameter part 43 and the stepped surface 45. A length of the vane rotation shaft 23 in an axial direction is smaller than a length of the large diameter part 43, which is a portion associating to the first diameter of the bearing hole 31, in the axial direction.

Since the bearing hole 31 communicates with the scroll flow path 16 through the gap 37, a pressure in the bearing hole 31 is affected by a pressure of the scroll flow path 16. Then, due to the pressure in the bearing hole 31, a force of pushing the nozzle vane 21 toward the hub-side ring 34 side along the rotation axis J acts on the distal end surface 23a of the vane rotation shaft 23. This force is referred to as "F1."

On the other hand, a gap 49 in the circumferential direction is formed between the hub-side ring 34 and the turbine housing 4. The mechanism space 28 communicates with the scroll flow path 16 through the gap 49. Therefore, a pressure in the mechanism space 28 is affected by the pressure of the scroll flow path 16. Then, due to the pressure in the mechanism space 28, a force of pushing the nozzle vane 21 toward the shroud-side ring 33 side along the rotation axis J acts on a distal end surface 24a of the vane rotation shaft 24. This force is referred to as "F2." As described above, the vane main body 22 is slightly movable in the axial direction in the nozzle flow path 19. Then, an axial position of the vane main body 22 in the nozzle flow path 19 depends on a balance between the force F1 and the force F2. Further, since the vane rotation shaft 23 and the vane rotation shaft 24 have the same outer diameter, projection areas when viewed in the axial direction are also the same. Therefore, after all, the axial position of the vane main body 22 depends on a balance between the pressure in the gap 47 (hereinafter referred to as pressure P1) and the pressure in the mechanism space 28 (hereinafter referred to as pressure P2).

Next, an example operation of the turbocharger 1 as described above will be described. In order to improve performance of the turbocharger 1, the vane main body 22 is located closer to the shroud-side ring 33 in the nozzle flow path 19 during operation. In the turbocharger 1, the opening 42 of the bearing hole 31 on the gap 37 side is smaller than the opening 41 of the bearing hole 31 on the nozzle flow path 19 side. Therefore, the pressure in the bearing hole 31 is affected by the pressure of the scroll flow path 16 through the opening 42 having a narrowed diameter.

Therefore, in this case, due to a pressure loss caused by the opening 42, the pressure P1 of the gap 47 in the bearing hole 31 decreases compared to a case in which the opening 42 has the same diameter as the opening 41. Then, the force F1 acting on the distal end surface 23a of the vane rotation shaft 23 decreases, and as a result, the vane main body 22 exhibits a tendency of being closer to the shroud-side ring 33 in the nozzle flow path 19. On the other hand, when the force F1 is too small, the vane main body 22 is pressed against the shroud-side ring 33, smooth rotation of the vane main body 22 is hindered due to friction. Therefore, the force F1 may be adjusted appropriately.

In the turbocharger 1, the balance between the pressure P1 and the pressure P2 is adjusted by changing the diameter of the opening 42 and the inner diameter of the small diameter part 44, and thereby a force in the axial direction (difference between the force F1 and the force F2) acting on the vane main body 22 can be selected to facilitate an adjustment of the axial position of the vane main body 22 during operation, and to improve the performance of the turbocharger 1.

Figure 4:
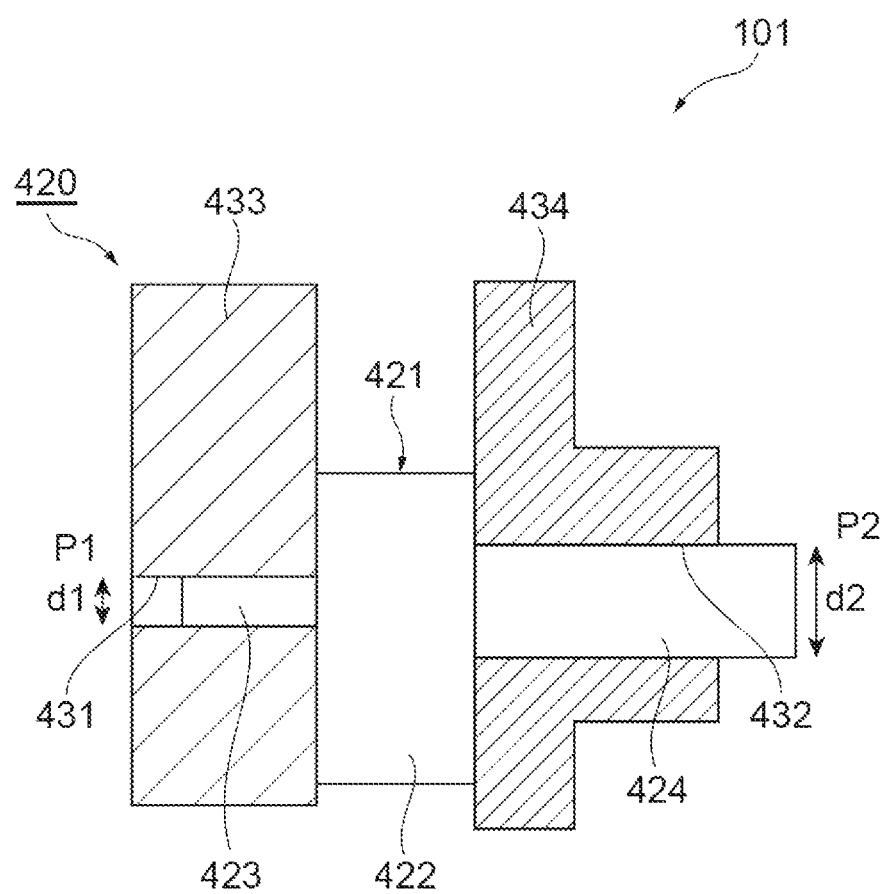
FIG. 4 is a cross-sectional view illustrating part of a nozzle unit in another example variable capacity turbocharger.

An example method for adjusting the balance of the above-described forces F1 and F2 acting on the nozzle vane 421 of the nozzle unit 420 is described with reference to the configuration illustrated in FIG. 4. FIG. 4 is a cross-sectional view illustrating the nozzle vane 421, shroud-side ring 433 and the hub-side ring 434 of the nozzle unit 421 in another example variable capacity turbocharger 101. For example, the outer diameters d1 and d2 of the vane rotation shafts 423 and 424 may be made different from each other to adjust projection areas of the vane rotation shafts 423 and 424 when viewed in the axial direction. With further reference to FIG. 4, the outer diameter d1 of the vane rotation shaft 423 is smaller than the outer diameter d2 of the vane rotation shaft 424. The inner diameter of the bearing hole 431 inserted the vane rotation shaft 423 is smaller than the inner diameter of the bearing hole 432 inserted the vane rotation shaft 424. The outer diameters of the vane rotation shafts 423 and 424 may be made different by changing a design related to operability of the nozzle vane 421. The inner diameters of the bearing holes 431 and 432 may be made different by changing a design related to operability of the nozzle vane 421.

The turbocharger 1 illustrated in FIG. 2 may be configured such that the inner diameter of the small diameter part 44 may be appropriately selected to adjust the pressure P1 with the outer diameters of the vane rotation shafts 23 and 24 being same. On the other hand, the turbocharger 101 may be configured such that the outer diameter d1 of the vane rotation shaft 423 may be appropriately selected to adjust the pressure P1 with the outer diameters of the vane rotation shafts 423 and 424 being different.

In order to reduce the force F1 acting on the nozzle vane 21 and 421, the gap 37 side of the bearing hole 31 and 431 may be completely closed, that is, by making the bearing hole 31 and 431 without having an opening into the gap 37. However, if the bearing hole 31 and 431 are closed, the force F1 may be too small, the vane main body 22 and 422 are pressed against the shroud-side ring 33 and 433, and thus there is a likelihood that smooth rotation of the vane main body 22 and 422 will be hindered due to friction.

Next, another example variable capacity turbocharger 102 will be described with reference to FIG. 5. The example variable capacity turbocharger 102 includes a shroud-side ring 53 instead of the shroud-side ring 33. Other than this, the example variable capacity turbocharger 102 of FIG. 5 has the same configuration as the variable capacity turbocharger 1 described above, and therefore, the same or equivalent components will be denoted by the same reference signs in the drawings and duplicate description thereof will be omitted.

Figure 5:
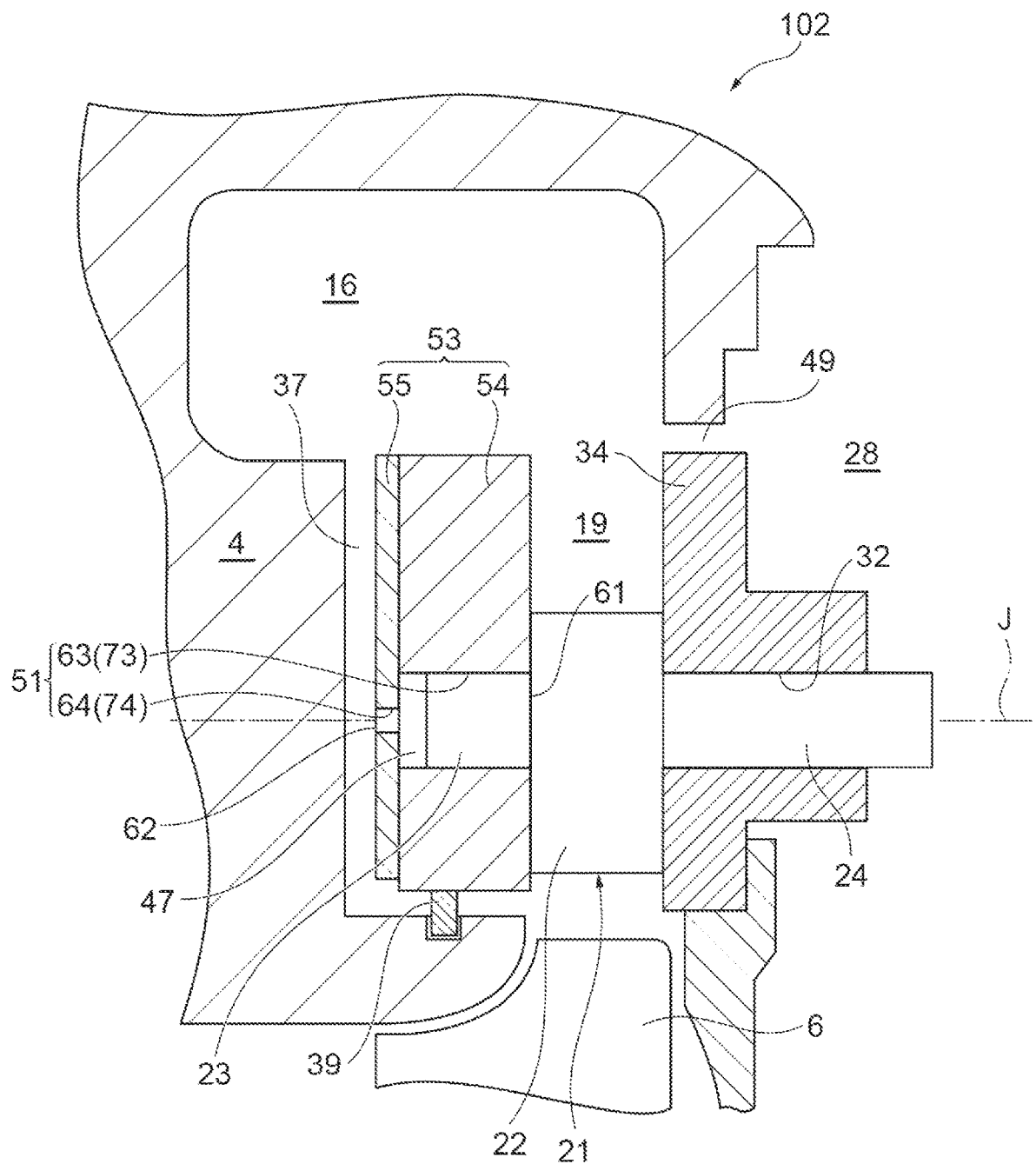
FIG. 5 is an enlarged cross-sectional view illustrating part of a nozzle unit in another example variable capacity turbocharger.

As illustrated in FIG. 5, the shroud-side ring 53 includes a ring main body part 54 and a lid member 55. A through hole 73 that penetrates in an axial direction and into which a vane rotation shaft 23 is inserted is provided in the ring main body part 54. A length of the through hole 73 in the axial direction is larger than a length of the vane rotation shaft 23 in the axial direction. The lid member 55 is joined to a surface of the ring main body part 54 on a gap 37 side to close the through hole 73. Then, a small hole 74 penetrating the lid member 55 is provided, and the small hole 74 allows the gap 37 and the through hole 73 to communicate with each other. An inner diameter of the small hole 74 is smaller than an inner diameter of the through hole 73. The lid member 55 has an annular shape that is substantially the same shape as the ring main body part 54 when viewed from the axial direction. Although the lid member 55 may comprise an integral annular member, in other examples different lid members may be provided at positions corresponding to the through holes 73, respectively.

The example variable discharge turbocharger 102 may therefore comprise a bearing hole 51 including a large diameter part 63 formed by the above-described through hole 73 and a small diameter part 64 formed by the above-described small hole 74. Then, a configuration in which an opening 62 of the bearing hole 51 on the gap 37 side is smaller than an opening 61 of the bearing hole 51 on a nozzle flow path 19 side is realized in order to achieve the same or similar operations and effects as those described with respect to the example turbocharger 1.

It is to be understood that not all aspects, advantages and features described herein may necessarily be achieved by, or included in, any one particular example. Indeed, having described and illustrated various examples herein, it should be apparent that other examples may be modified in arrangement and detail.

The invention claimed is:

1. A variable capacity turbocharger comprising:
   a variable nozzle unit including:
      a first nozzle ring in which a first bearing hole is provided;
      a second nozzle ring in which a second bearing hole is provided;
      a nozzle flow path formed between the first nozzle ring and the second nozzle ring; and
      a nozzle vane disposed in the nozzle flow path and supported by both the first bearing hole and the second bearing hole; and
   a turbine housing including a scroll flow path connected to the nozzle flow path,
   wherein the first bearing hole penetrates the first nozzle ring and communicates with the scroll flow path through a gap between the first nozzle ring and the turbine housing, and
   wherein a first opening of the first bearing hole adjacent to the gap is smaller than a second opening of the first bearing hole adjacent to the nozzle flow path.

2. The variable capacity turbocharger according to claim 1, wherein the nozzle vane includes:
   a first rotation shaft inserted into the first bearing hole; and
   a second rotation shaft inserted into the second bearing hole, and
   wherein the first rotation shaft and the second rotation shaft have identical diameters and are aligned along a rotation axis of the nozzle vane.

3. The variable capacity turbocharger according to claim 1, wherein an inner diameter of the first opening is smaller than an inner diameter of the second bearing hole.

4. The variable capacity turbocharger according to claim 1, further comprising:
   a drive mechanism disposed on an opposite side of the second nozzle ring from the nozzle flow path, the drive mechanism configured to rotate the nozzle vane; and
   a mechanism space for accommodating the drive mechanism and fluidly coupled to the scroll flow path,
   wherein a position of the nozzle vane varies depending on a pressure balance between the gap and the mechanism space.

5. The variable capacity turbocharger according to claim 1, wherein the first bearing hole includes:
   a large diameter portion of the first bearing hole into which a first rotation shaft of the nozzle vane is inserted via the second opening; and
   a small diameter portion of the first bearing hole including the first opening and having a smaller diameter than the large diameter portion,
   wherein a stepped diameter surface is formed between the large diameter portion and the small diameter portion, and
   wherein a length of the first rotation shaft in an axial direction of the first bearing hole is less than a length of the large diameter portion in the axial direction.

6. The variable capacity turbocharger according to claim 5, wherein the first nozzle ring includes:
   a ring main body part having the first opening of the first bearing hole; and
   a lid member joined to the ring main body part and having the second opening of the first bearing hole.

7. The variable capacity turbocharger according to claim 1, wherein the gap includes a first end connected to the scroll flow path and a second end connected to the nozzle flow path, and the second end is located further from the scroll flow path than the nozzle vane.

8. The variable capacity turbocharger according to claim 7, further comprising a sealing member located in the gap near the second end.

9. The variable capacity turbocharger according to claim 8, further comprising a turbine impeller at least partially located in the housing, wherein the sealing member is arranged between the first nozzle ring and the turbine impeller.

10. The variable capacity turbocharger according to claim 9, wherein a portion of the housing encircles the turbine impeller, and the sealing member is located between the portion of the housing and the first nozzle ring.

11. The variable capacity turbocharger according to claim 10, wherein the portion of the housing is located between the first nozzle ring and the turbine impeller.

12. The variable capacity turbocharger according to claim 1, wherein the first nozzle ring comprises:
a ring main body part facing the nozzle flow path; and
a lid member joined to the ring main body part and facing the gap, and
wherein the first bearing hole penetrates the ring main body part and the lid member.

13. The variable capacity turbocharger according to claim 12, further comprising a turbine impeller at least partially located in the turbine housing,
wherein the scroll flow path is located in the turbine housing and encircles the turbine impeller, and the first nozzle ring and the second nozzle ring faces each other in the turbine housing.

14. The variable capacity turbocharger according to claim 12, wherein the lid member comprises a portion of the first bearing hole having a smaller diameter than a diameter of the rotation shaft.

15. The variable capacity turbocharger according to claim 12, further comprising a space located on an opposite side of the second nozzle ring to the nozzle flow path and fluidly coupled to the scroll flow path, wherein a position of the nozzle vane varies depending on a pressure balance between the gap and the space.

16. The variable capacity turbocharger according to claim 12, wherein the gap includes a first end connected to the scroll flow path and a second end connected to the nozzle flow path, and the second end is provided between the nozzle vane and the turbine impeller.

17. The variable capacity turbocharger according to claim 16, wherein a sealing member for sealing the gap is arranged within the gap between the first nozzle ring and the turbine impeller.

18. The variable capacity turbocharger according to claim 17, wherein a portion of the housing encircles the turbine impeller, and the sealing member is located between the portion of the housing and the first nozzle ring.

19. The variable capacity turbocharger according to claim 1,
wherein the first bearing hole rotatably supports a first rotation shaft of the nozzle vane,
wherein the second bearing hole rotatably supports a second rotation shaft of the nozzle vane, and
wherein the first rotation shaft and the second rotation shaft have different diameters and align along a rotation axis of the nozzle vane.

20. The variable capacity turbocharger according to claim 19,
wherein the gap is formed between the first nozzle ring and the turbine housing, and is located on an opposite side of the first nozzle ring to the nozzle flow path, and
wherein the opening of the first bearing hole faces the gap.

* * * * *